(12) United States Patent
Hokazono et al.

(10) Patent No.: US 7,543,715 B2
(45) Date of Patent: Jun. 9, 2009

(54) VEHICLE FUEL CAP WITH AXIAL LONGITUDINAL GROOVES IN CASING BODY

(75) Inventors: Shoichi Hokazono, Wako (JP); Yoshinobu Terada, Wako (JP); Kazuhisa Ishida, Nishikasugai-gun (JP)

(73) Assignees: Honda Motor Co., Ltd., Tokyo (JP); Toyoda Gosei Co., Ltd., Aichi (JP)

( * ) Notice: Subject to any disclaimer, the term of this patent is extended or adjusted under 35 U.S.C. 154(b) by 731 days.

(21) Appl. No.: 11/179,192

(22) Filed: Jul. 12, 2005

(65) Prior Publication Data
US 2006/0037959 A1 Feb. 23, 2006

(30) Foreign Application Priority Data
Aug. 23, 2004 (JP) ............................. 2004-242506

(51) Int. Cl.
B65D 51/16 (2006.01)
B65D 53/00 (2006.01)
B60C 19/08 (2006.01)

(52) U.S. Cl. ...................... 220/303; 220/304; 220/86.2; 220/DIG. 33; 220/203.24; 220/203.28; 361/217

(58) Field of Classification Search ................. 220/303, 220/86.2, 304, 203.24, 203.28, DIG. 33; 361/217
See application file for complete search history.

(56) References Cited

U.S. PATENT DOCUMENTS

| 5,975,328 | A | * | 11/1999 | Hagano et al. | ............... 220/288 |
| 5,996,830 | A | * | 12/1999 | Hagano et al. | ......... 220/203.28 |
| 6,197,858 | B1 | * | 3/2001 | Hagano et al. | ............... 524/225 |
| 2005/0017009 | A1 | * | 1/2005 | Malskorn et al. | ............ 220/304 |

FOREIGN PATENT DOCUMENTS

JP        3389850        1/2003

* cited by examiner

Primary Examiner—Robin Hylton
(74) Attorney, Agent, or Firm—Hamre, Schumann, Mueller & Larson, P.C.

(57) ABSTRACT

A vehicle fuel cap comprises a casing body for opening/closing a filler opening of a filler neck communicating with a fuel tank; and a lid that is equipped at an upper portion of the casing body and is formed of a conductive material, and the vehicle fuel cap forms a discharge portion in the lid for discharging static charge in the lid to the filler neck, wherein the discharge portion comprises a projection form provided on an inner peripheral face of the lid opposite to an outer peripheral edge of the filler opening, and on the inner peripheral face a longitudinal groove is formed at both sides of the discharge portion and along an axial direction of the casing body.

5 Claims, 4 Drawing Sheets

VEHICLE FUEL CAP WITH AXIAL LONGITUDINAL GROOVES IN CASING BODY

BACKGROUND OF THE INVENTION

1. Field of the Invention

The present invention relates to a fuel cap for opening/closing a filler opening of a fuel tank of a vehicle, and particularly, to a vehicle fuel cap where static charge in a human body is earthed through the fuel cap.

2. Description of the Related Art

Conventionally, a vehicle fuel cap is known as disclosed in paragraphs 0052 to 0063 and FIGS. 1, 11, 16 32, and 33 of Japanese Patent No. 3389850 (hereinafter referred to as patent document 1).

FIGS. 6A and 6B are drawings showing a conventional vehicle fuel cap: FIG. 6A is a perspective drawing of a lid of the fuel cap; FIG. 6B is a half-section drawing of the fuel cap.

As shown in FIG. 6B, a conventional vehicle fuel cap 100 is designed to form a lid 200 having a gripper 210, which a fuel filling person grips, of a conductive resin member, to make a discharge projection 220 of the lid 200 come near a filler neck 300 made of steel, and thereby to discharge static charged in a human body. In other words, when the fuel filling person grips the lid 200 in opening/closing a filler opening 310 of the filler neck 300, the conventional vehicle fuel cap 100 earths the static charge in the human body from the lid 200 to the filler neck 300 and through a bracket (not shown) to a vehicle body side, and prevents a spark from being discharged within the filler opening 310 and a discomfort by the static (for example, see the patent document 1).

The discharge projection 220 consists of sheet-form projection pieces projected toward a center side from four places of an inner wall 240 of an opening end of the lid 200. Between the discharge projection 220 and the filler neck 300 is set a gap L1 consisting of a discharge distance of not more than 1 mm in order to be able to obtain a mild discharge characteristic.

The gap L1 is preferably not more than 0.65 mm and comparatively demands an accuracy. When the gap L1 is too large, it becomes difficult to discharge (earth) static.

On the other hand, when there is no gap L1 and the fuel cap 100 is attached to/detached from the filler neck 300 in a state of the lid 200 and the filler neck 300 making contact, a feeling is generated in rotating and fastening the fuel cap 100 because a friction resistance occurs by the lid 200 and the filler neck 300 making contact and a desired fastening force (axial force) of the fuel cap is not obtained. In addition, in this case the lid 200 and the filler neck 300 make contact and wear, thereby a surface treatment film is lost, and a rust also sometimes occurs.

Consequently, in the conventional fuel cap 100, in order to eliminate the problems and improve the accuracy of the gap L1, a slit 230 for preventing a surface sink in injection molding is formed in a vicinity of the discharge projection 220 of the lid 200.

However, in the fuel cap 100 of the patent document 1 the slit 230 is formed long at an outer peripheral portion of the lid 200, so there is a problem of an appearance being bad because the slit 230 is within a view of a fuel filling person when he/she opens/closes the filler opening 310 by the fuel cap 100.

In addition, the slit 230 is approximately same in length in a center-line direction of the fuel cap 100 as the discharge projection 220 and is formed comparatively long. Accordingly, there is a problem that a dust and the like invade into the fuel cap 100 from one of the slits 230.

Consequently, a vehicle fuel cap is strongly requested that reduces a dust invasion and has a good appearance.

SUMMARY OF THE INVENTION

In order to solve the problems, a vehicle fuel cap of a first aspect of the present invention comprises a casing body for opening/closing a filler opening of a filler neck communicating with a fuel tank; and a lid that is equipped at an upper portion of the casing body and is formed of a conductive material, and the vehicle fuel cap forms a discharge portion in the lid for discharging static charged in the lid to the filler neck, wherein the discharge portion comprises a projection form provided on an inner peripheral face of the lid opposite to an outer peripheral edge of the filler opening, and on the inner peripheral face a longitudinal groove is formed at both sides of the discharge portion and along an axial direction of the casing body.

In accordance with the vehicle fuel cap of the first aspect of the present invention, because the discharge portion comprises the projection form provided on the inner peripheral face of the lid, it can narrow a gap between the inner peripheral face of the lid and the filler neck, prevent a dust from invading into the fuel cap from the gap, and thus make an outer diameter of the lid smaller.

In addition, the lid can improve a dust prevention and an appearance thereof with keeping a dimensional accuracy by changing a slit formed in a lid of a conventional fuel cap to a longitudinal groove.

Furthermore, on the inner peripheral face of the lid is formed the longitudinal groove along the axial direction of the casing body. The longitudinal groove can prevent an occurrence of a surface sink due to a thermal contraction, where the inner peripheral face of the lid becomes a depression, and improve a dimensional accuracy of a gap between the discharge portion and the filler neck in injection-molding the lid with a conductive resin material and cooling/solidifying it. Thus when a fuel filling person attaches/detaches a fuel cap, static charged in him/her is preferably discharged, and thereby a discomfort by the static can be eliminated.

A vehicle fuel cap of a second aspect of the present invention is a cap of the first aspect, wherein in the lid a depression is formed at an opening end side of the longitudinal groove.

In accordance with the vehicle fuel cap of the second aspect of the present invention, even when because the depression is formed at the opening end side of the longitudinal groove of the lid, an end of the lid screwed in a filler neck abuts with a vehicle body due to a dimensional variation, a passage communicating in an atmospheric air from relief valves (positive pressure valve and negative pressure valve) for adjusting an air pressure within a fuel tank can be prevented by the depression from being shut off.

BRIEF DESCRIPTION OF THE DRAWINGS

FIG. 6A is a perspective drawing of a lid of the fuel cap; FIG. 6B is a half-section drawing of the fuel cap.

DESCRIPTION OF THE PREFERRED EMBODIMENTS

Here will be described a vehicle fuel cap of an embodiment of the present invention, referring to FIGS. 1 to 5.

Figure 1:
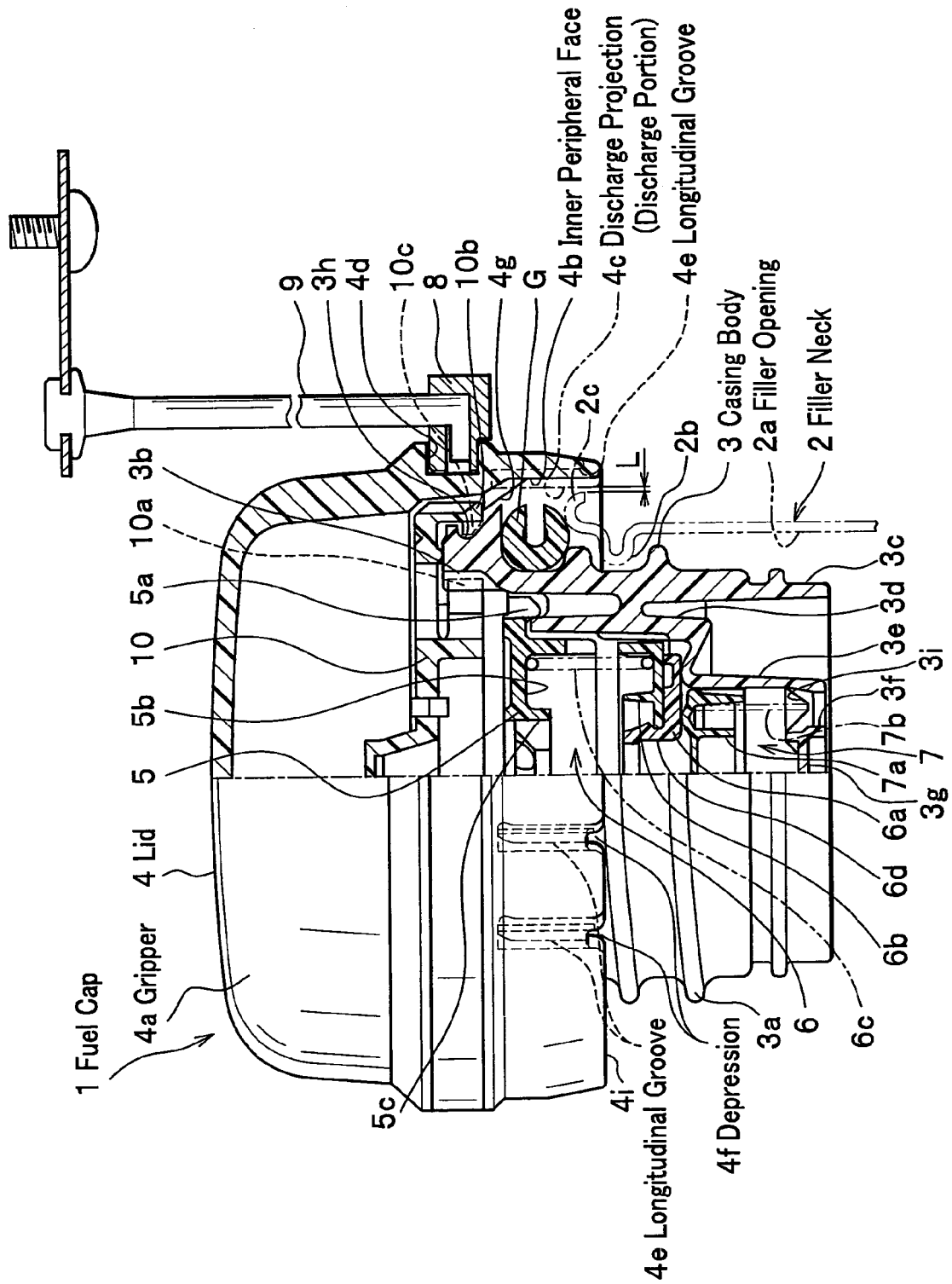
FIG. 1 is a half-section drawing showing a vehicle fuel cap related to an embodiment of the present invention.

FIG. 1 is a half-section drawing showing a vehicle fuel cap related to an embodiment of the present invention.

Meanwhile, although because a fuel cap 1 changes in an up/down direction according to a placement direction thereof, its direction is arbitrary, hereinafter a description will be performed, making it an up direction a direction where a lid 4 of FIG. 1 is arranged.

[Fuel Cap]

As shown in FIG. 1, the fuel cap 1 is a lid member screwed in a filler neck 2, where a filler opening 2a for supplying fuel to a fuel tank (not shown) is formed, and for opening/closing the filler opening 2a. The fuel cap 1 comprises a casing body 3 screwed in the filler neck 2; the lid 4 that is equipped at an upper portion of the casing body 3 through a torque plate 10 and has a gripper 4a which a fuel filling person pinches with fingers; an inside lid 5 for closing an upper opening of the casing 3 and forming a valve chamber of a positive pressure valve 6; the positive pressure valve 6 and a negative pressure valve 7 for being housed in a positive-pressure-valve-chamber forming portion 3d and adjusting an air pressure within the fuel tank (not shown); a gasket G for sealing a spacing between the casing 3 and the filler neck 2; a tether ring 8 fitted in the lid 4; and a tether 9 for coupling the tether ring 8 to a vehicle body (not shown).

[Filler Neck]

The filler neck 2 consists of a tubular member formed by a conductive metal communicating with the fuel tank (not shown) and at an upper end thereof has the filler opening 2a for supplying fuel to the fuel tank (not shown). An intermediate portion of the filler neck 2 is fixed at the vehicle body (not shown) by a bracket and is electrically connected so as to earth static flowing in the filler neck 2 to the vehicle body. At the filler opening 2a of the filler neck 2 is formed a female screw portion 2b, and by screwing the female screw portion 2b in a male screw portion 3a formed on an outer peripheral face of the casing body 3, it is designed that the gasket G provided at an outer peripheral edge 2c of an end opening of the filler opening 2a is contacted with a pressure, and that the filler opening 2a is sealed by the fuel cap 1.

At the outer peripheral edge 2c of the filler opening 2a, through a predetermined gap L, are oppositely arranged discharge projections 4c of an inner peripheral face 4b of the lid 4 described later. The outer peripheral edge 2c of the filler neck 2 is adjacently arranged to the discharge projections 4c of the lid 4, and thereby when a fuel filling person charged with static opens/closes the lid 4, the static is discharged to the outer peripheral edge 2c from the discharge projections 4c, and the outer peripheral edge 2c is designed to be able to earth the static to the vehicle body (not shown) through the filler neck 2.

[Casing Body]

The casing body 3 is a substantially cylindrical member with a bottom where the male screw portion 3a screwed in the female screw portion 2b of the filler neck 2 is formed on an outer peripheral face thereof and is formed of a non-conductive synthetic resin material such as polyacetal. The casing body 3 has the male screw portion 3a and the gasket G and comprises a substantially cylindrical outer tubular portion 3c having a hook portion 3b for hooking them on a ratchet claw portion 10a of the torque plate 10; the positive-pressure-valve-chamber forming portion 3d like a cylinder provided inside the outer tubular portion 3c; a negative-pressure-valve-chamber forming portion 3e provided in conjunction with the positive-pressure-valve-chamber forming portion 3d and formed like a substantial cylinder with a bottom smaller in diameter than the positive-pressure-valve-chamber forming portion 3d; and a through hole 3f formed on a bottom face of the negative-pressure-valve-chamber forming portion 3e. Within the casing body 3 are provided the positive pressure valve 6 and the negative pressure valve 7. In the casing body 3 the hook portion 3b of the outer tubular portion 3c is hooked on the ratchet claw portion 10a of the torque plate 10, is hooked on the torque plate 10 by a hook groove 3h being hooked on a hook claw 10c, an elastic hook piece 10b of the torque plate 10 is hooked on a claw portion 4g of the lid 4, and thereby if a rotation force not less than a predetermined value is acted on the lid 4, the casing body 3 is hooked so as to run idle.

<Outer Tubular Portion>

The outer tubular portion 3c is a substantially cylindrical member, the male screw portion 3a is formed outside, and inside a center portion is integrally coupled the positive-pressure-valve-chamber forming portion 3d smaller in diameter than the outer tubular portion 3c. Within the outer tubular portion 3c is housed the inside lid 5.

<Positive-Pressure-Valve-Chamber Forming Portion>

The positive-pressure-valve-chamber forming portion 3d is a cylindrical portion for housing a positive pressure spring 6c, a spring receiver 6b, and a positive pressure valve body 6a and forms a housing of the positive pressure valve 6. In conjunction with a lower end of the positive-pressure-valve-chamber forming portion 3d is integrally provided the negative-pressure-valve-chamber forming portion 3e smaller in diameter than the positive-pressure-valve-chamber forming portion 3d.

<Negative-Pressure-Valve-Chamber Forming Portion>

The negative-pressure-valve-chamber forming portion 3e is a cylindrical portion with a bottom that houses the negative pressure valve 7 and a negative pressure spring 7b, respectively, and where a bottom plate 3g having the through hole 3f is provided in conjunction with a bottom face thereof, and forms a housing of the negative pressure valve 7. At an upper opening end of the negative-pressure-valve-chamber forming portion 3e, like a step, is formed the positive-pressure-valve-chamber forming portion 3d larger in diameter than the negative-pressure-valve-chamber forming portion 3e, and in contact with the upper opening end with a pressure is the positive pressure valve body 6a energized by the positive pressure spring 6c.

[Inside Lid]

The inside lid 5 is a ring-form member that is fixed at an upper opening end of the cylindrical positive-pressure-valve-chamber forming portion 3d, and where an upper end of the positive pressure spring 6c is in contact with a pressure. On a lower face of the inside lid 5 are formed projections 5a that project from four places of an outer peripheral portion toward a down direction and are deposited at the positive-pressure-valve-chamber forming portion 3d by ultrasonic welding; and a spring receiver 5b where the upper end of the positive pressure spring 6c is contacted with a pressure. At a center side of the spring receiver 5b is drilled a flow passage hole 5c communicated with an outside of the fuel cap 1 from an inside of the positive pressure valve 6.

[Positive Pressure Valve]

The positive pressure valve 6 is a valve for adjusting a positive pressure within the fuel tank (not shown) and is housed within the positive-pressure-valve-chamber forming portion 3d. The positive pressure valve 6 comprises the positive-pressure-valve-chamber forming portion 3d for forming a housing of the positive pressure valve 6; the inside lid 5 for closing an upper opening of the positive-pressure-valve-chamber forming portion 3d; the positive pressure valve body 6a arranged at a lower opening of the positive-pressure-valve-chamber forming portion 3d; the spring receiver 6b for supporting the positive pressure valve body 6a and the positive pressure spring 6c; and the positive pressure spring 6c for energizing the positive pressure valve body 6a in the down direction through the spring receiver 6b, and the inside lid 5 in the up direction.

<Positive Pressure Valve Body>

The positive pressure valve body 6a is substantially a ring member formed of a synthetic rubber and the like, and at a center portion thereof is formed a valve flow passage hole 6d. On an upper face of the positive pressure valve body 6a is fitted the spring receiver 6b energized by the positive pressure spring 6c.

<Positive Pressure Spring>

The positive pressure spring 6c consists of a compression spring of which elastic resistance force is larger than that of the negative pressure spring 7b, and is a spring for making the positive pressure valve body 6a contact the upper opening end of the negative-pressure-valve-chamber forming portion 3e with a pressure through the spring receiver 6b when an inner pressure of the fuel tank (not shown) is a positive pressure not more than a predetermined value.

[Negative Pressure Valve]

The negative pressure valve 7 is a valve for adjusting a negative pressure within the fuel tank (not shown) and is housed within the negative-pressure-valve-chamber forming portion 3e. The negative pressure valve 7 comprises the negative-pressure-valve-chamber forming portion 3e for forming a housing of the negative pressure valve 7; the negative pressure valve body 7a made of a resin that closes an upper opening of the negative-pressure-valve-chamber forming portion 3e; the negative pressure spring 7b for energizing the negative pressure valve body 7a in the up direction; and a bottom plate 3g having a spring receiver 3i of the negative pressure spring 7b and the through hole 3f.

<Negative Pressure Valve Body>

The negative pressure valve body 7a is substantially a disc-form member for moving up/down within the negative-pressure-valve-chamber forming portion 3e by an inner pressure value of the fuel tank (not shown) and, for example, formed of a synthetic resin material such as polyacetal. The negative pressure valve body 7a has, on an upper face thereof, an annular protrusion contacting the positive pressure valve body 6a with a pressure, and on a lower face thereof forms the spring receiver 3i of the negative pressure spring 7b.

<Negative Pressure Spring>

The negative pressure spring 7b consists of a compression spring of which elastic resistance force is smaller than that of the positive pressure spring 6c. When an inner pressure within the fuel tank (not shown) is a positive pressure not less than a predetermined value, the inner pressure and the elastic resistance force of the negative pressure spring 7b resist the positive pressure spring 6c, and the negative pressure spring 7b makes the spring receiver 6b, the positive pressure valve body 6a, and the negative pressure valve body 7a ascend. On the other hand, when an inner pressure within the fuel tank (not shown) is a negative pressure not more than the predetermined value, the negative pressure resists the elastic resistance force of the negative pressure spring 7b, and the spring 7b makes the negative pressure valve body 7a descend.

[Torque Plate]

The torque plate 10 is a member intervening between the casing body 3 and the lid 4 for holding an upper end of the outer tubular portion 3c of the casing body 3, and is formed of a synthetic resin material. The torque plate 10 comprises a ratchet mechanism for allowing nothing but a rotation in a closing direction of the lid 4 and preventing the fuel cap 1 from being closed too much by making the fuel cap 1 run idle, when the rotation in the closing direction becomes a torque not less than a predetermined value. The torque plate 10 comprises the elastic hook piece 10b that is hooked on the claw portion 4g of the lid 4 formed outside an outer peripheral portion and holds the lid 4; the hook claw 10c that is formed inside the outer peripheral portion and engages in the hook groove 3h formed at an end of the casing body 3; and the ratchet claw portion 10a that is hooked on the hook portion 3b of the casing body 3 and configures the ratchet mechanism.

<Ratchet Claw Portion>

The ratchet claw portion 10a is an elastic hook piece having a claw at an end thereof and is formed, cutting through the torque plate 10. A periphery of the ratchet claw portion 10a cut through forms a flow passage where an inside of the torque plate 10 and an outside of the fuel cap 1 are communicated.

<Ratchet Mechanism>

The torque plate 10 comprises a ratchet mechanism configured of the hook portion 3b and the ratchet claw portion 10a. Thus if when a fuel filling person screws the fuel cap 1 into the filler opening 2a, a force for rotating the lid 4 is less than a predetermined value, in the torque plate 10 the ratchet claw portion 10a and the hook portion 3b engage each other, the lid 4 and the casing body 3 integrally rotate, and thereby the fuel cap 1 is attached to the filler neck 2 with an appropriate fastening force.

On the other hand, because if a force for rotating the lid 4 is not less than a predetermined value, the hook portion 3b engaging in the ratchet claw portion 10a runs idle with overriding it, it does not occur that when opening the filler opening 2a the fuel cap 1 can not be removed by being strongly screwed into the filler neck 2.

[Lid]

Figure 2:
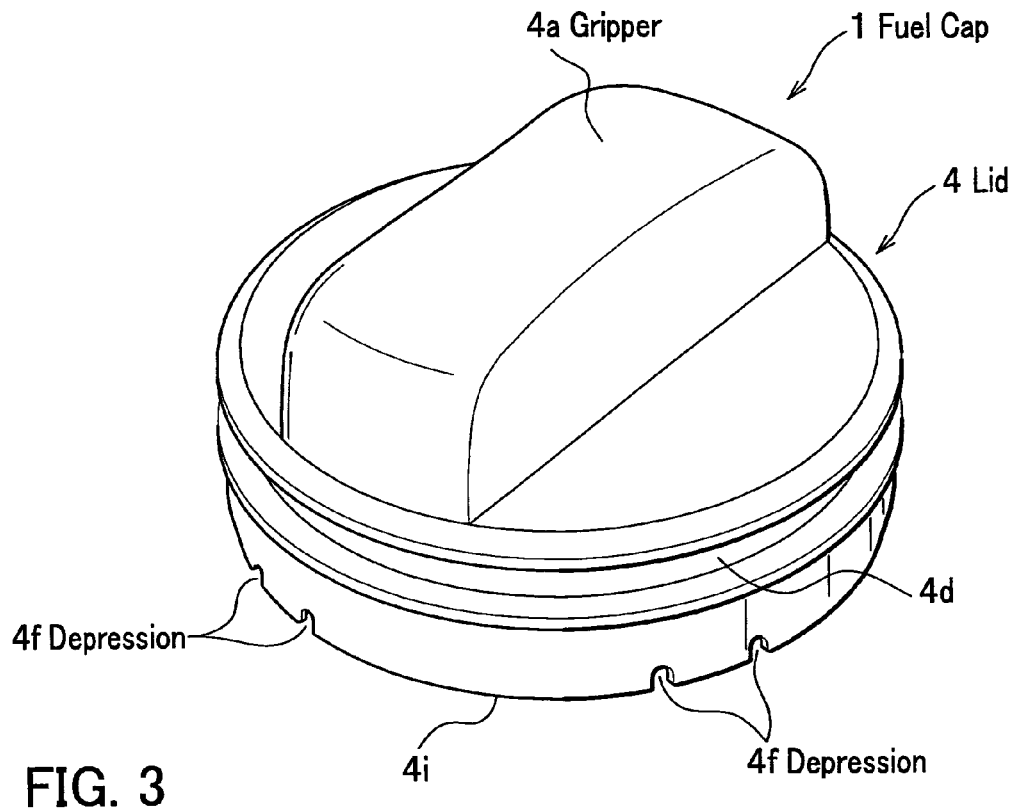
FIG. 2 is a perspective drawing of a lid of the vehicle fuel cap related to the embodiment of the present invention.
Figure 3:
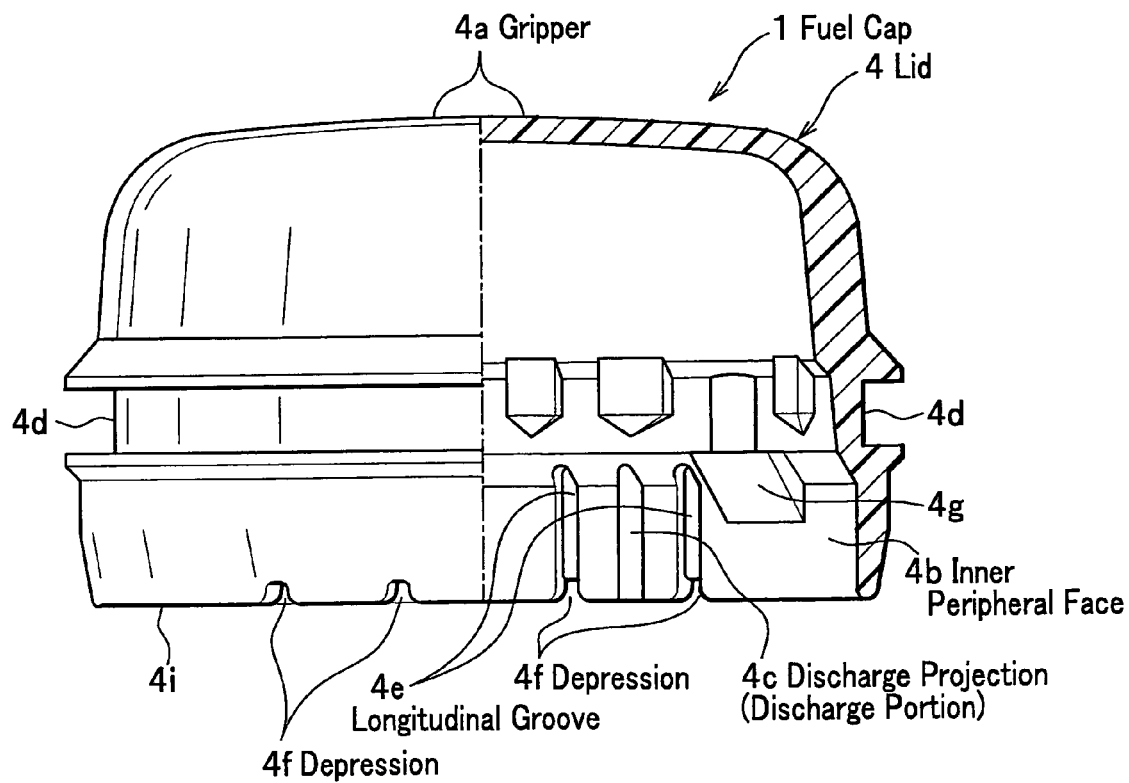
FIG. 3 is a half-section drawing of the lid of the vehicle fuel cap related to the embodiment of the present invention.
Figure 4:
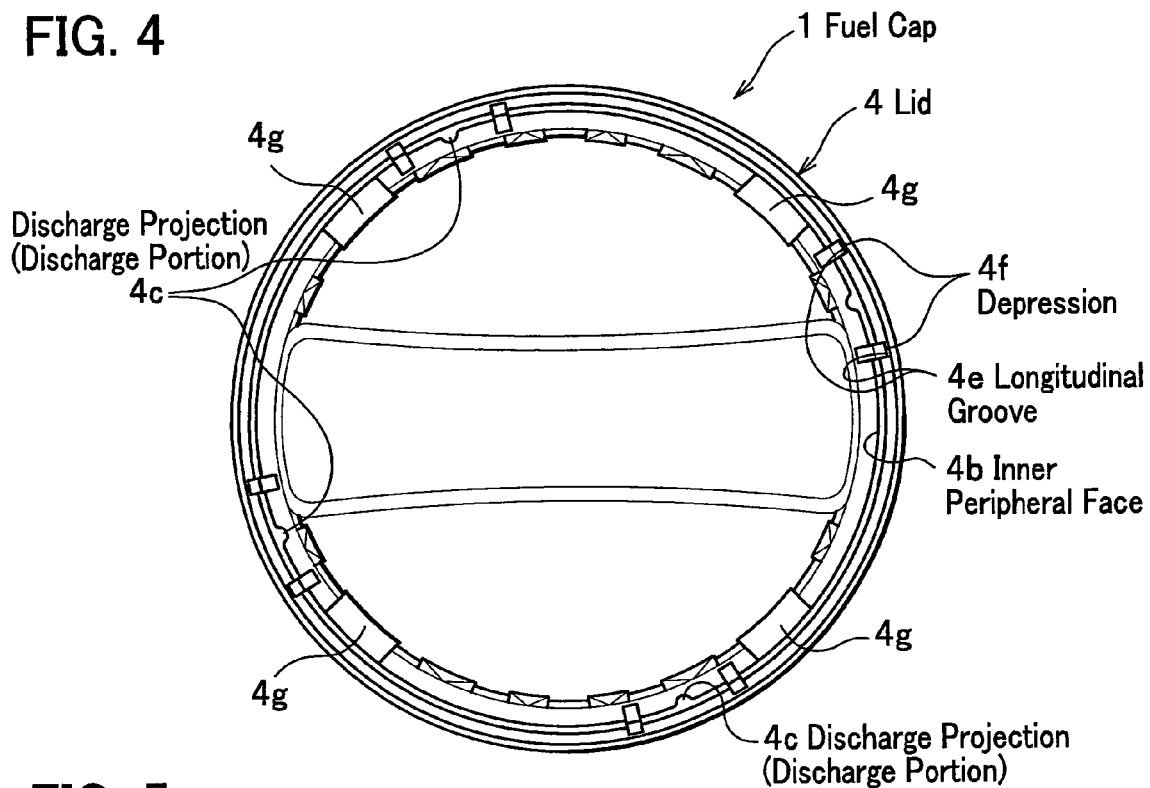
FIG. 4 is a bottom plan drawing of the lid of the vehicle fuel cap related to the embodiment of the present invention.

FIG. 2 is a perspective drawing of a lid of a vehicle fuel cap related to an embodiment of the present invention. FIG. 3 is a half-section drawing of a lid of a vehicle fuel cap related to an embodiment of the present invention. FIG. 4 is a bottom plan drawing of a lid of a vehicle fuel cap related to an embodiment of the present invention.

As shown in FIG. 2, the lid 4 is a member having the gripper 4a for rotating the fuel cap 1 by pinching it with fingers when a fuel filling person opens/closes the filler opening 2a; and a conductive member formed by a synthetic resin material such as nylon containing a conductive carbon and a conductive filler.

As shown in FIG. 3, the lid 4 comprises the gripper 4a formed on an upper face thereof; an annular groove 4d that is formed at a center of an outer peripheral portion thereof, and where the tether ring 8 (see FIG. 1) is fitted; longitudinal grooves 4e formed on the inner peripheral face 4b below the annular groove 4d; depressions 4f formed at a side of an opening end 4i of the longitudinal grooves 4e; the discharge projection 4c formed between each of the longitudinal grooves 4e; and the claw portion 4g that is formed at an upper end of the inner peripheral face 4b, and where the elastic hook piece 10b of the torque plate 10 is hooked.

As shown in FIG. 4, the lid 4 is equipped at the torque plate 10 in a state of being attachable thereto/detachable therefrom by a plurality of claw portions 4g formed on the inner peripheral face 4b and is built in the casing body 3 through the torque plate 10 (see FIG. 1).

<Inner Peripheral Face>

Figure 5:
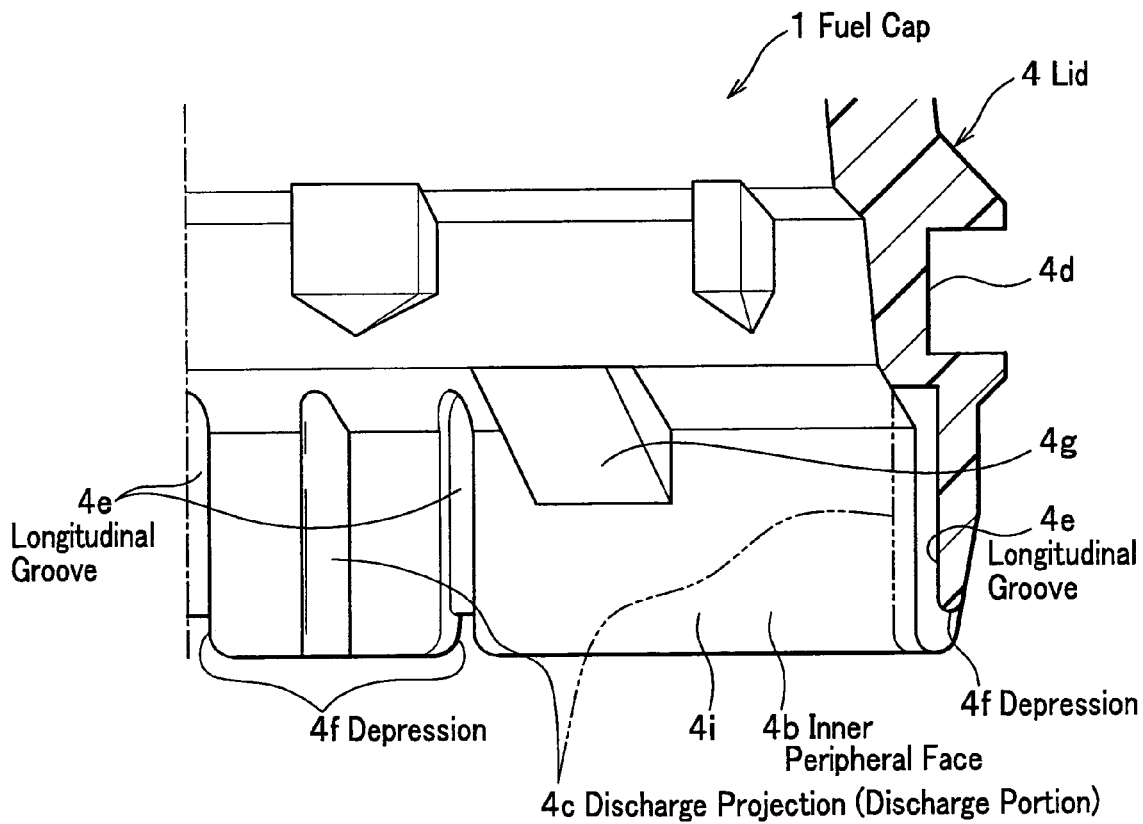
FIG. 5 is a main portion enlarged section drawing of the lid of the vehicle fuel cap related to the embodiment of the present invention.

FIG. 5 is a main portion enlarged section drawing of a lid of a vehicle fuel cap related to an embodiment of the present invention.

As shown in FIG. 1, the inner peripheral face 4b is a place of the lid 4 opposite to the outer peripheral edge 2c of the filler opening 2a when the fuel cap 1 is equipped at the filler opening 2a.

As shown in FIG. 5, on the inner peripheral face 4b are formed the claw Portion 4g formed at a back side thereof; the discharge projection (discharge portion) 4c consisting of a projection; the longitudinal grooves 4e formed at both sides of the discharge projection 4c and along an axial direction of the casing body 3; and the depressions 4f.

<Longitudinal Groove>

The longitudinal grooves 4e are grooves plurally formed on the inner peripheral face 4b in order to improve a dimensional accuracy of the discharge projection 4c, and by forming the longitudinal grooves 4e, a part of a thickness of an opening end of the lid 4 is made thinner and a thermal contraction of a resin material in injection molding is made smaller. The longitudinal grooves 4e are formed on the inner peripheral face 4b along the axial direction of the casing body 3 (see FIG. 1).

<Depression>

The depressions 4f are depressions for preventing a passage, which communicates in the atmospheric air from the positive pressure valve 6 and the negative pressure valve 7 (see FIG. 1) for adjusting an air pressure within the fuel tank (not shown), from being shut off even when the opening end 4i of the lid 4 abuts with the vehicle body due to a dimensional variation in opening/closing the fuel cap 1.

<Discharge Projection>

As shown in FIG. 1, the discharge projection (discharge portion) 4c is one for discharging static charged in a fuel filling person to the filler neck 2 and earthing it, when he/she pinches the gripper 4a and attaches/detaches the fuel cap 1 to/from the filler neck 2. The discharge projection 4c is provided on the inner peripheral face 4b at a lower end of the lid 4 along an opening/closing direction of the fuel cap 1, and is protruded, for example, from four places in a center direction (see FIG. 4) so as to be arranged at a position opposite to an outer opening end of the filler opening 2a of the filler neck 2 when the casing body 3 is screwed in the filler neck 2.

Meanwhile, in order to perform a discharge so as not to give a discomfort to a fuel filling person in removing the fuel cap 1, it is preferable that the gap L is, for example, not more than 1 mm, and furthermore that the discharge projection 4c at not less than one place is arranged so that the gap L becomes not more than 0.65 mm, in order to surely perform the discharge and make static charged in him/her not more than a predetermined value regardless of a closing condition of the fuel cap 1. In addition, in order to mildly perform a discharge and lessen an impact thereof, a volume specific resistivity is preferably $10^4$ to $10^9$ Ω·cm.

[Tether Ring]

The tether ring 8 is a ring member of which one end is screwed in a fuel filler lid (not shown) of the vehicle body, and for coupling the other end of the tether 9 to the lid 4, and for example, is formed of thermoplastic polyester elastomer (TPEE) with an oil resistance.

[Tether]

The tether 9 is a string-form coupling member of which one end is coupled to the tether ring 8 fixed at the lid 4 and the other end is coupled to a reverse face of the fuel filler lid (not shown), and for coupling the fuel cap 1 and the vehicle body. The tether 9 is formed, for example, of thermoplastic polyurethane elastomer (TPU) with a wear resistance.

[Action]

Next will be described an action of a vehicle fuel cap related to an embodiment of the present invention, referring to FIGS. 1 to 5.

As shown in FIGS. 3 to 5, in the lid 4 are formed a plurality of longitudinal grooves 4e on the inner peripheral face 4b in an up/down direction of an axial direction of the fuel cap 1. Therefore, because if injection molding the lid 4 with a synthetic resin material, the longitudinal grooves 4e absorb a thermal contraction and surface sink of the resin material, it is enabled to form the inner peripheral face 4b and the discharge projections 4c with an accurate dimension.

Thus because the dimension of the gap L between the discharge projection 4c an the filler neck 2 shown in FIG. 1 is made accurate, it becomes enabled to discharge static charged in a fuel filling person to the filler neck 2 from the lid 4 in an appropriate state.

Figure 6A:
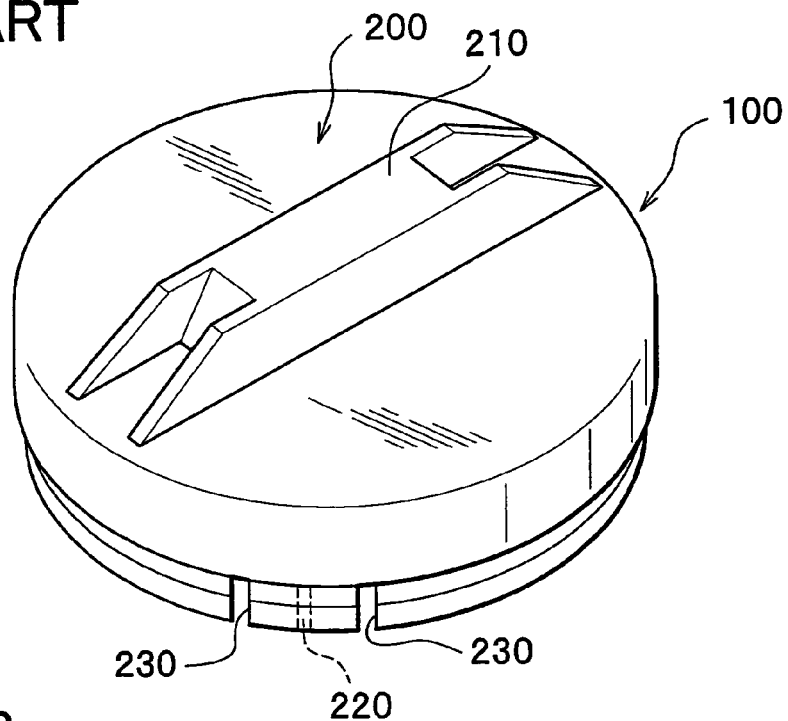
FIGS. 6A and 6B are drawings showing a conventional vehicle fuel cap.
Figure 6B:
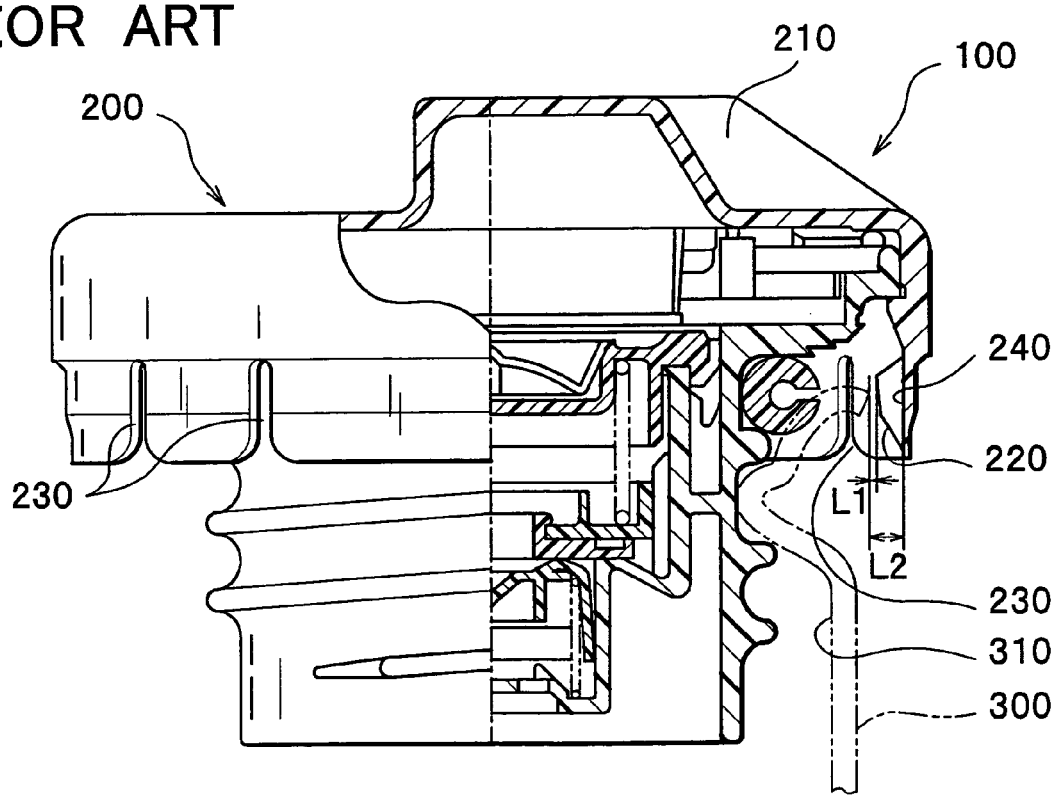

In addition, the lid 4 can improve an appearance of the fuel cap 1 by abolishing the slit 230 long in a longitudinal direction existing in the conventional fuel cap 100 shown in FIG. 6 and forming the depressions 4f and the longitudinal grooves 4e.

Next will be described a discharge, referring to FIG. 1.

Particularly if a fuel filling person stays at a dry place of an atmospheric air, static charges in him/her. Then if a driver pulls a fuel lid opener (not shown), a fuel filler lid (not shown) thereof automatically opens. If the fuel filling person touches the lid with a finger in order to supply fuel, the static charged in him/her is discharged to the peripheral portion 2c of the filler neck 2 from the discharge projections 4c of the lid 4.

Meanwhile, if rotating the fuel cap 1, the discharge projections 4c moves in an opening/closing direction for the filler neck 2 integrally with the lid 4 and the casing body 3. At this time, because the discharge projections 4c constantly move along an axial direction, they are constant in the gap (discharge distance) L regardless of a closing condition of the fuel cap 1, and thus a stable discharge is always performed.

Thus because static is earthed to a vehicle body side from the filler neck 2, a discomfort due to the static is not given in removing the fuel cap 1, and in addition, it is enabled to prevent a spark from being discharged within the filler opening 2a.

Because if a fuel filling person releases a hand from the fuel cap 1, the fuel cap 1 is coupled to the fuel filler lid through the tether ring 8 and the tether 9, the fuel cap 1 becomes a state of suspending from the fuel filler lid. At this time, because the fuel cap 1 is located at a distant position from the filler opening 2a and does not contact a fuel supply gun, it is easy to perform a fuel supply work.

Completing the fuel supply, the fuel filling person grips the fuel cap 1 suspending downward from the fuel filler lid and screws the filler neck 2 into the filler opening 2a. The fuel cap 1 rotates integrally with the lid 4, the torque plate 10, the casing body 3, and the positive pressure valve 6 and the negative pressure valve 7 provided inside the casing body 3. Then if the male screw portion 3a is screwed in the female screw portion 2b and a force for rotating the lid 4 becomes not less than a predetermined value, the fuel cap 1 results in being screwed in the filler neck 2 with an appropriate force because the hook portion 3b engaging in the ratchet claw portion 10a runs idle with overriding it.

Next will be described a case that an inner pressure of a fuel tank is a normal value.

When an inner pressure of a fuel tank (not shown) is a normal value, the positive pressure valve body 6a is energized by the positive pressure spring 6c through the spring receiver 6b, a lower face of the positive pressure valve body 6a is made to contact an upper end face of the negative-pressure-valve-chamber forming portion 3e and an upper face of the negative pressure valve body 7a with a pressure, and thus the negative-pressure-valve-chamber forming portion 3e is sealed. The negative pressure valve body 7a is energized by the negative pressure spring 7b and is made to contact the positive pressure valve body 6a with a pressure.

Next will be described a case that an inner pressure of a fuel tank is a negative pressure.

For example, if fuel within a fuel tank (not shown) is used and reduced, an inner pressure thereof becomes a negative pressure for an atmospheric air, and a pressure added to the negative pressure valve body 7a becomes not more than a predetermined value, then according to the negative pressure the negative pressure valve body 7a moves downward with resisting the negative pressure spring 7b and separates to a lower side from the positive pressure valve body 6a. Whereat is formed a passage between the negative pressure valve body 7a and the negative-pressure-valve-chamber forming portion 3e and between the negative pressure valve body 7a and the positive pressure valve body 6a.

Thus an atmospheric air invades in the fuel cap 1 from between the filler neck 2 and the lid 4, then enters in the fuel tank with passing through a space of a periphery of the ratchet claw portion 10a; the flow passage hole 5c; the valve flow passage hole 6d; between the positive pressure valve body 6a and the negative pressure valve body 7a; between the negative pressure valve body 7a and the negative-pressure-valve-chamber forming portion 3e; and the through hole 3f, and the state of the negative pressure within the fuel tank is eliminated.

Then if the negative pressure added to the negative pressure valve body 7a becomes lower than an energizing force of the negative pressure spring 7b, the negative pressure valve body 7a is closed.

Next will be described a case that an inner pressure of a fuel tank is a positive pressure.

For example, if a periphery temperature of a fuel tank (not shown) becomes higher and an inside thereof is heated, an inner pressure thereof rises.

If the inner pressure of the fuel tank (not shown) becomes higher and a pressure added to the negative pressure valve body 7a pushing the positive pressure valve body 6a exceeds a predetermined value, then according to the inner pressure the negative pressure valve body 7a is pushed by an air pressure of the fuel tank, makes the positive pressure valve body 6a and the spring receiver 6b ascend, and compresses the positive pressure spring 6c. Whereat is formed a passage between the negative pressure valve body 7a and the negative-pressure-valve-chamber forming portion 3e and between the positive pressure valve body 6a and the positive-pressure-valve-chamber forming portion 3d.

Thus an atmosphere within the fuel tank is discharged from the through hole 3f, passing through between the negative pressure valve body 7a and the negative-pressure-valve-chamber forming portion 3e; between the positive pressure valve body 6a and the positive-pressure-valve-chamber forming portion 3d; the flow passage hole 5c; a periphery gap of the ratchet claw portion 10a; a gap between the torque plate 10 and the lid 4; a gap between the casing body 3 and the lid 4; and a gap between the filler neck 2 and the inner peripheral face 4b of the lid 4, and the inner pressure of the fuel tank is adjusted.

Then if a positive pressure added through the negative pressure valve body 7a, the positive pressure valve body 6a, and the spring receiver 6b becomes lower than an energizing force of the positive pressure spring 6c, the negative pressure valve body 7a is closed.

In addition, because if the opening end 4i of the lid 4 screwed in the filler neck 2 abuts with the vehicle body due to a dimensional variation of the fuel cap 1, the depressions 4f are formed at the opening end 4i, it is enabled to prevent a passage, which communicates in the atmospheric air from the positive pressure valve 6 and the negative pressure valve 7 for adjusting an air pressure within the fuel tank, from being shut off by the depressions 4f.

Meanwhile, the present invention is not limited to the embodiment, various modifications and variations thereof are available within a range of the technical spirit of the invention, and it goes without saying that the invention covers these modified and varied ones.

For example, the lid 4 is not limited to be formed of a conductive resin material: it may be formed of a non-conductive synthetic resin material, and a conductive material may be plated or coated on the surface of the lid 4, the inner peripheral face 4b, and the discharge projections 4c.

In the embodiment, although it is exemplified to perform a discharge between the discharge projections 4c and the filler neck 2, it is not limited thereto: for example, a vehicle body side member may be provided that can discharge static to the opposite positions of the discharge projections 4c and earth it.

What is claimed is:

1. A vehicle fuel cap comprising:
   a casing body for opening and closing a filler opening of a filler neck communicating with a fuel tank;
   a lid equipped at an upper portion of said casing body and formed of a conductive material; and
   a discharge portion for discharging static charged in said lid to said filler neck, said discharge portion being formed in said lid,
   wherein said discharge portion comprises a projection provided on an inner peripheral face of a wall of said lid opposite to an outer peripheral edge of said filler opening, and on said inner peripheral face a longitudinal groove is formed at both sides of said discharge portion and along an axial direction of said casing body so that a thickness of the wall is thinner along the longitudinal grooves.

2. A vehicle fuel cap according to claim 1, wherein a depression is formed in said wall of said lid at an opening end side of said longitudinal grooves.

3. A vehicle fuel cap according to claim 1, wherein said conductive material is a nylon resin material containing any of a conductive carbon and a conductive filler.

4. A vehicle fuel cap according to claim 1, wherein a gap between said discharge portion and said filler neck is set to be not more than 1 mm.

5. A vehicle fuel cap according to claim 3, wherein a volume specific resistivity of said conductive material is set to be $10^4$ to $10^9$ $\Omega \cdot cm$.

* * * * *